UNITED STATES PATENT OFFICE.

ROBERT H. STONE, OF BRIGHTON, VICTORIA.

PROCESS OF MANUFACTURING ARTIFICIAL STONE.

SPECIFICATION forming part of Letters Patent No. 280,332, dated June 26, 1883.

Application filed March 29, 1883. (No specimens.) Patented in Victoria, February 8, 1878, No. 2,477; in Tasmania October 24, 1881, No. 208; in England November 10, 1881, No. 4,927; in South Australia December 6, 1881, No. 218; in New South Wales, January 7, 1882; in New Zealand, December 29, 1882, No. 757, and in Queensland, December 30, 1882.

*To all whom it may concern:*

Be it known that I, ROBERT HOLDEN STONE, a subject of the Queen of Great Britain, residing at New Street, Brighton, in the British colony of Victoria, have invented an Improved Process of Manufacturing Artificial Stone, (for which patents have been granted to me and my assignees in Victoria, dated the 8th day of February, 1878, and numbered 2,477;
Tasmania, dated the 24th day of October, 1881, and numbered 208; Great Britain, dated the 10th day of November, 1881, and numbered 4,927; South Australia, dated the 6th day of December, 1881, and numbered 218; New South Wales, dated the 7th day of January, 1882; New Zealand, dated the 29th day of December, 1882, and numbered 757; and Queensland, dated the 30th day of December, 1882;) and I do hereby declare that the following is a full, clear, and exact description of the invention, which will enable others skilled in the art to which it appertains to make and use the same.

The object of this invention is to manufacture artificial stone by the formation in an improved manner of silicate of lime (or of hydro-silicate of calcium *in situ*) as the matrix or cementing medium, the said matrix being in chemical contact with the silicious aggregates employed to form the bulk of the stone, and produced by the action of heated water or heated solutions of lime permeating the mass, after it has been molded into the blocks required, as hereinafter more particularly described.

I first take as aggregates any natural silica or silicate—such as sand, disintegrated quartz, or other silicious rocks or earths—a portion of which should be either naturally in or reduced to an amorphous condition, whether or not in natural combination with any metallic base. I next take lime, either quicklime (by preference ground) or an equivalent of slaked lime, by preference in the form of a pure hydrate, (or hydroxide of calcium.) These materials I mix, the aggregates in various degrees of disintegration, so that their particles shall, with those of the lime employed, reduce the volume of voids in the finished stone to a minimum. If quicklime is used, I employ a sufficient quantity of water with the aggregates to cause its perfect hydration before the next stage of the process, and use it in such proportions only as necessary to thoroughly coat every particle of the aggregates, no more being required. The above materials I then thoroughly triturate with such a further quantity of water only as required to form a mass of sufficient plasticity to render it capable of being compacted by ramming or pressing in molds of any form required, it being advisable to avoid any excess of moisture beyond that necessary to permanently compact the materials. The concrete mass is then molded, preferentially, by ramming in the required form, when the molds can be at once removed, turning out the molded piece, to set on any suitable bed. To prevent carbonization of the exterior of the stone while setting, it is advisable to wash the surface over with a weak solution of silica in any convenient form, (a dialysed solution being preferable,) thereby forming immediately a surface of silicate of lime. This portion of the process is, however, not absolutely necessary, and is not claimed by me as a portion of my invention. The process of setting will ordinarily occupy from three to ten days, and is to enable the blocks to be handled with safety; and, although not necessary longer than to set the surface, by preference I allow time enough for it to take place throughout the mass. I next place the blocks in baths or tanks of any suitable form and immerse them in water, (by preference charged with lime or other solution of calcium,) for the purpose of preventing the immediate dissolving or washing out of the lime near the surface of the stone. The tanks are then gradually heated by any suitable appliance, as by steam-pipes, and maintained at an average temperature of 200° Fahrenheit, by preference under 212°, until the requisite degree of hardness is acquired throughout the mass, the time being from forty-eight hours to six days, the combined action of the lime, water, and moist heat forming a solvent, acting on the surfaces of the aggregates, and, with the amorphous portions of them, forming, as is believed, the matrix of silicate of lime. This action is believed to take place by the alkaline base of calcium in solution by the continuous supply of water acting on the silica, and forming an insoluble silicate of lime (or hydrosilicate of calcium) in an analogous manner to the formation of other alkaline but soluble silicates under analogous conditions. It is essential to the appearance and perfection of surface that no degree of heat should be applied to subject the stone to the disintegrating action of steam by expansion.

The following form and proportion of materials are successfully employed, and form a good stone: sand, (free from all vegetable matter,) seventy to eighty per cent., by measure; amorphous silica or silicates, as calcined clay, ten per cent., by measure; quicklime reduced to hydrate, ten per cent., by measure; water, ten per cent., by measure.

I do not confine myself to the precise details herein specified, such as the precise proportions of the materials used, nor to the time of their treatment, so long as the nature of my invention be retained, although in these particulars I have stated those which I believe to be the best; nor do I claim the manufacture of artificial stone by the admixture of limes and silicates, as I am aware that such admixtures are already in use; but What I do claim is—

My improved process of manufacturing artificial stone, the essence of which consists in the use and application of heated water, with or without lime in solution, to such combinations of lime and silicates, to form a matrix of silicate of lime or hydrosilicate of calcium, substantially as herein described and explained.

ROBERT HOLDEN STONE.

Witnesses:
WALTER SMYTHE BAYSTON,
BEDLINGTON BODYCOMB.